US005483458A

United States Patent [19]

Lee et al.

[11] Patent Number: 5,483,458

[45] Date of Patent: Jan. 9, 1996

[54] PROGRAMMABLE CLOCK MODULE FOR POSTAGE METERING CONTROL SYSTEM

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 164,100

[22] Filed: Dec. 9, 1993

[51] Int. Cl.$^{6}$ .......................................... G05B 11/01

[52] U.S. Cl. .................... 364/464.02; 318/625; 364/130; 364/140; 364/143; 364/221.9; 364/DIG. 1; 395/775

[58] Field of Search .............................. 364/464.02, 130, 364/140, 143, 464.02; 395/775; 318/625

[56] References Cited

U.S. PATENT DOCUMENTS

| | | | |
|---|---|---|---|
| 4,395,756 | 7/1993 | Daniels | 364/200 |
| 4,638,452 | 1/1987 | Schultz et al. | 364/900 |
| 4,644,498 | 2/1987 | Bedard et al. | 364/900 |
| 4,814,792 | 3/1989 | Yamanobe et al. | 346/108 |
| 4,816,823 | 3/1989 | Polkinghorne et al. | 340/825.15 |
| 4,931,712 | 6/1990 | DiGiulio et al. | 318/625 |
| 5,097,437 | 3/1992 | Larson | 395/775 |
| 5,121,327 | 6/1992 | Salazar | 364/464.02 |
| 5,191,533 | 3/1993 | Haug | 364/464.03 |
| 5,267,172 | 11/1993 | Vermesse | 364/464.02 |
| 5,301,116 | 4/1994 | Grünig | 364/464.02 |

*Primary Examiner*—Edward R. Cosimano
*Attorney, Agent, or Firm*—Charles G. Parks, Jr.; Melvin J. Scolnick

[57] ABSTRACT

The electronic postage meter includes a printing unit which is responsive to a plurality of motors for printing of a postage indicia in response to control circuit. The control circuit is comprised of a programmable microprocessor in bus communication with an accounting means having memory units for accounting for the postage printed by the printing unit responsive to the programming of the microprocessor. An integrated circuit includes an address decoding module means for generating a unique combination of ASIC control signals in response to a respective address placed on the bus by the microprocessor. A timer register is responsive to ones of the control signals from the address decoding module to enable writing of the timer data into the timer registers by the microprocessor. The timer unit is responsive to the timer data for generating one of a plurality of timing signal in accordance with timer data. The data also includes motor data. Prime motor register units are responsive to other ones of the control signals from the address decoding module to enable writing of the motor data into the timer registers by the microprocessor. A motor control unit is responsive to the motor data for generating a plurality of motor control signals in accordance with the motor data.

3 Claims, 2 Drawing Sheets

PROGRAMMABLE CLOCK MODULE FOR POSTAGE METERING CONTROL SYSTEM

RELATED APPLICATIONS

The following applications are commonly assigned to Pitney Bowes Inc., filed concurrently on Dec. 9, 1993, U.S. patent application Ser. No. 08/163,627, entitled MULTIPLE PULSE WIDTH MODULATION CIRCUIT; U.S. patent application Ser. No. 08/165,134, entitled DUAL MODE TIMER-COUNTER; U.S. patent application Ser. No. 08/137,460, entitled DYNAMICALLY PROGRAMMABLE TIMER-COUNTER; U.S. patent application No. 5,377,264 issued on Dec. 27, 1994, entitled MEMORY ACCESS PROTECTION CIRCUIT WITH ENCRYPTION KEY; U.S. patent application Ser. No. 08/163,811, entitled MEMORY MONITORING CIRCUIT FOR DETECTING UNAUTHORIZED MEMORY ACCESS; U.S. patent application Ser. No. 08/163,771, entitled MULTI-MEMORY ACCESS LIMITING CIRCUIT FOR A MULTI-MEMORY DEVICE; U.S. patent application Ser. No. 08/163,790, entitled ADDRESS DECODER WITH MEMORY ALLOCATION FOR A MICRO-CONTROLLER SYSTEM; U.S. patent application Ser. No. 08/163,810, entitled INTERRUPT CONTROLLER FOR AN INTEGRATED CIRCUIT; U.S. patent application Ser. No. 08/163,812, entitled ADDRESS DECODER WITH MEMORY WAIT STATE CIRCUIT; U.S. Patent Application Ser. No. 08/163,813, entitled ADDRESS DECODER WITH MEMORY ALLOCATION AND ILLEGAL ADDRESS DETECTION FOR A MICRO-CONTROLLER SYSTEM; and U.S. patent application Ser. No. 08/163,629, entitled CONTROL SYSTEM FOR AN ELECTRONIC POSTAGE METER HAVING A PROGRAMMABLE APPLICATION SPECIFIC INTEGRATED CIRCUIT, unless otherwise noted, all of which patent applications are now pending.

BACKGROUND OF THE INVENTION

The present invention relates to a control system for an electronic postage metering system.

It is conventional to design a unique control system for each module of an electronic postage metering system. The control system is configured to meet the needs of the particular model of postage metering system in a cost efficient manner. The conventional electronic postage meter is comprised of a programmable microprocessor, a plurality of memory units and an application specific integrated circuit (ASIC). The ASIC function is to generate a plurality of system control signals in response to address instruction from the microprocessor. It is therefore conventional to design the ASIC to operate synchronously with the microprocessor. For example, a high speed electronic postage meter control system may include a 32 megahertz microprocessor and compatible application specific integrated circuit. In contrast, a less complex electronic postage meter control system, like that of the Pitney Bowes model 6900 Postage Meter, will include a 8 megahertz microprocessor and compatible ASIC. As a result of this and other variations between EPM models, it is customary to develop a specific ASIC for each EPM model.

SUMMARY OF THE INVENTION

It is an objective of the present invention to present an ASIC having a programmable timer-clock module which generates clock pulses at one of a plurality of frequencies depending on the programming in order to match the ASIC clock rate to that of the microprocessor chosen.

The control system for a electronic postage meter (EPM) is comprised of a programmable microprocessor in bus communication with memory units for accounting for the postage printed by a printing unit responsive to the programming of the microprocessor. An integrated circuit which forms a part of the control system includes an address decoding module for generating a unique combination of ASIC control signals in response to a respective address place on the bus by the microprocessor. The ASIC also includes a clock timer module. The clock timer module includes timer registers which are responsive to ones of the control signals from the address decoding module to enable writing of the timer data into the timer registers by the microprocessor. The timer module is responsive to the timer data for generating one of a plurality of timing signals of varying frequencies in accordance with the timer data. The ASIC also includes a PWM module having PWM registers. The PWM registers are responsive to other ones of the control signals from the address decoding module to enable writing of the PWM motor data into the PWM registers by the microprocessor. The PWM module is responsive to the PWM data for generating a plurality of PWM control signals in accordance with the motor data to the motor controller for effecting the operation of the respective motors.

In combination, the programmability of the ASIC clock-timer module and PWM module enables a single ASIC to be utilized with any combination of clock frequency microprocessors for controlling the printing of a postage indicia and accounting for the postage printed. Other benefits of the present invention will be appreciated from a reading of the following detailed description.

DETAILED DESCRIPTION OF THE PREFERRED EMBODIMENT

Figure 1:
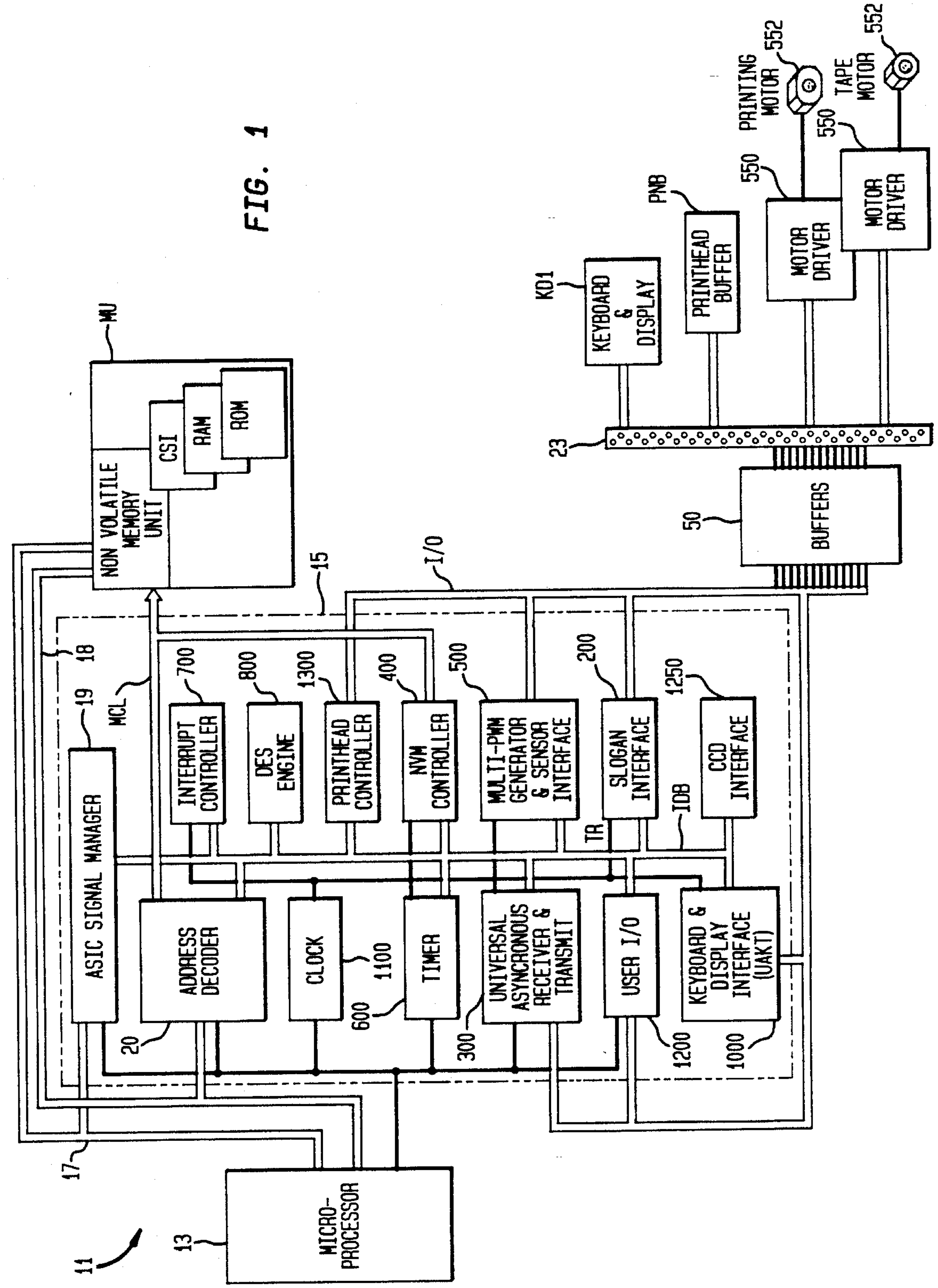
FIG. 1 is a schematic of a microcontroller system for a thermal printing EPM in accordance with the present invention.

Referring to FIG. 1, a microprocessor control system, generally indicated as 11, which is preferably intended to control a thermal printing postage meter (not shown), is comprised of a microprocessor 13 in bus 17 and 18 communication with an application specific integrated circuit (ASIC) 15 and a plurality of memory units (MU). The ASIC 15 is comprised of a number of integrated circuits, for example, ASIC signal manager 19, address decoder 20, clock 1100, timer module 600, UART module 300, user I/O 1200, Keyboard, Printhead Controller 1300 and display interface 1000, interrupt control 700, encryption and decryption engine 800, memory controller 400, multi-PWM generator and sensor interface 500 and a slogan interface 200 and CCD interface 1250. It should be appreciated that it is within the contemplation of the present invention that the IC modules which make up the ASIC 15 may vary and the modules here identified are intended to illustrate the preferred embodiment of the invention.

The ASIC has an internal data bus (IDB) and a plurality of control lines CL, one group of which control lines are module interrupt lines IR. Certain of the modules are in communication with a buffer 50 via the bus I/O. The buffer 50 is in bus communication with a coupler 23. The coupler 23 is in communication with various meter devices, such as, the key board display KDI, print head buffer PHB and motor drivers 550 which drive respective motors 552. In FIG. 1, the bus lines IDB and IB, and control lines IR and CL are depicted in simplified manner for the purpose of clarity.

Figure 2:
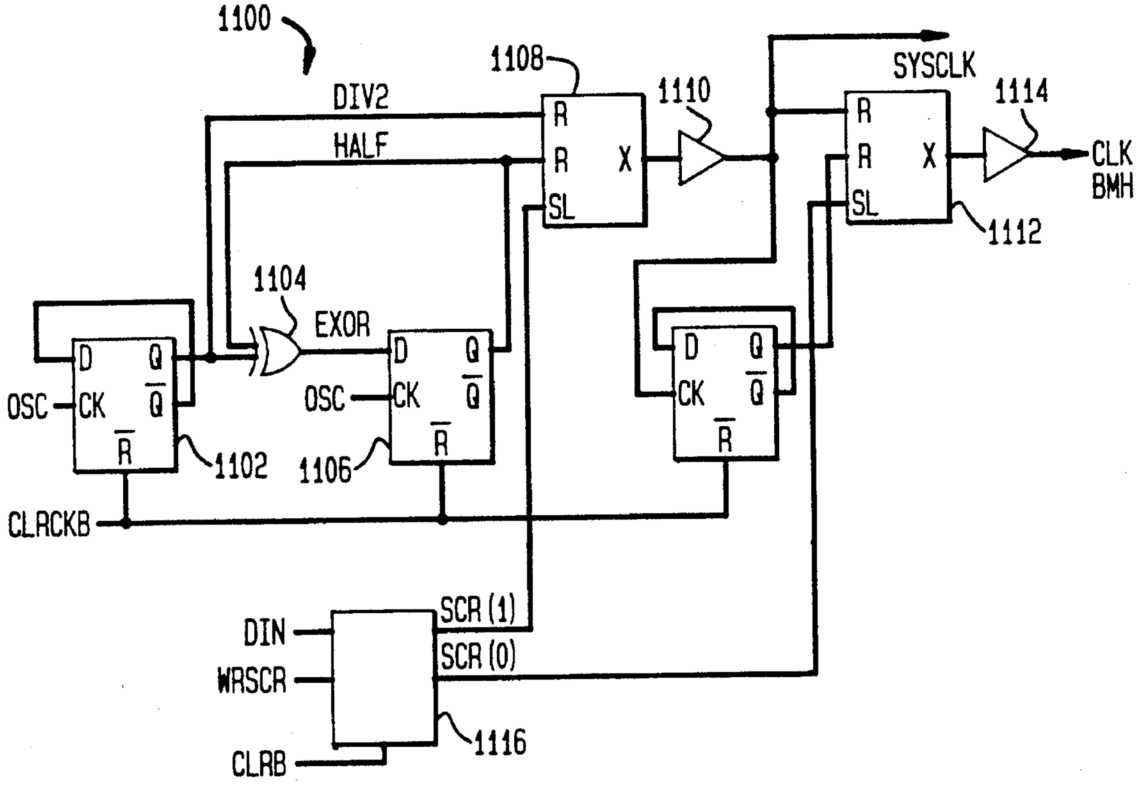
FIG. 2 is a schematic of a programmable system clock in accordance with the present invention.

Referring to FIG. 2, the clock module 1100 includes a first flip-flop 1102 having its high output directed to an X OR gate 1104. The low output of the flip-flop 1102 is directed back to the data input of that flip-flop. The system oscillator is directed to the clock input of flip-flop 1102. The high output from flip-flop 1102 is also directed to one input of a multiplex switch 1108 and a multiplex switch 1112. The output from the X OR gate 1104 is directed to the data input of a flip-flop 1106 which also receives the oscillating signal at its clock input. The high output from the flip-flop 1106 is directed to the other input of the X OR gate 1104 and the other input of the multiplex switch 1108. A clock reset is directed to the resets of both flip-flops 1102 and 1106.

The output from the multiplex switch 1108 is directed to a amplifier 1110 whose output is designated as system clock for the system clock use and is also directed to the other input of the multiplex switch 1112. The output multiplex switch 1112 is directed to an amplifier 1141 whose output is designated as the clock 8 megahertz. Included are a register 1116 having a data input, write input and a clear input. One of the outputs from the register 1116 is directed to the multiplex switch 1108 and the other output is directed to the multiplex switch 1112.

It is now observed that upon power-up of the system, the microprocessor causes a write to the registers 1116 by addressing the address decoder module 20 which then write enables the register 1116 in a conventional manner. The microprocessor puts the appropriate data on the data lines for writing into the register 1116 in a customary manner. Depending on the data write, the output from the registers places the multiplex switches in the appropriate switching position to drive the clock frequencies set forth in Table 1 depending on the frequency of the oscillating crystal, as specifically indicated in Table 1.

TABLE 1

| | SCR | | | |
|---|---|---|---|---|
| CRYSTAL | b0 | b2 | SYSCLK | CLK 8 MHz |
| 32 MHz | 0 | 0 | 16 MHz | 16 MHz |
| | 0 | 1 | 8 MHz | 8 MHZ |
| | 1 | 0 | 16 MHz | 8 MHz |
| | 1 | 1 | 8 MHz | 4 MHz |
| 16 MHz | 0 | 0 | 8 MHz | 8 MHz |
| | 0 | 1 | 4 MHz | 4 MHz |
| | 1 | 0 | 8 MHz | 4 MHz |
| | 1 | 1 | 4 MHz | 2 MHz |

Therefore, it is observed that with any given crystal frequency, one will achieve the clock frequencies indicated in Table 1 under the system clock column or the clock 8 MHz column. As a result, the system offers the advantage of allowing the ASIC to be utilized with larger systems by replacing the crystal with a 32 MHz crystal to receive 16 MHz and 4 MHz signals or utilizing a 16 MHz clock to get 8 MHz or 4 MHz clocking frequency combinations.

The above description represents the preferred embodiment and should not be viewed as limiting. The scope of the invention is presented in the appendix claims.

What is Claimed Is:

1. An improved electronic postage meter having a control system, said control system having a control circuit, a printing means for printing of a postage indicia in response to said control circuit, said printing means including a plurality of motors and respective motor drivers, each of said said plurality of motor and respective motor driver being one of a plurality of types, said control circuit having a programmable microprocessor, memory units, and an integrated circuit, said microprocessor being in bus communication with said memory units and said printing means, for accounting for said postage printed by said printing means in accordance with said microprocessor programming, said memory means for storing program data and generating data, and said improved electronic postage meter comprising:

said data stored in said memory units including timing data specific to said motor driver type, said integrated circuit having an address decoding module means for generating a unique combination of control signals in response to a respective address placed on said bus by said microprocessor, and having a timer registers means responsive to ones of said control signals from said address decoding module means to enable writing of said timer data into said timer registers by said microprocessor, and timer means responsive to said timer data written into said timer registers for generating one of a plurality of timing signals in accordance with timer data means for electronically communicating said timing signals to said motor drivers.

2. An improved electronic postage meter control system as claimed in claim 1 further comprising:

said data including motor data, said integrated circuit having motor register means responsive to other ones of said control signals from said address decoding module means to enable writing of said motor data into said motor registers by said microprocessor, and motor control means responsive to said motor data written to said motor register means and said generated timing data for generating a plurality of motor control signals in accordance with said motor data add said timing data.

3. An improved electronic postage meter control system as claimed in claim 2 further comprising:

said memory units including non-volatile memory unit, said non-volatile memory unit responsive to other ones of said control signals from said address decoding module to enable said non-volatile memory units for writing data from said non-volatile memory unit into said timer register means and said motor register means by said microprocessor, and said integrated circuit including non-volatile memory access timer means for causing said control signal from said address decoding module enabling said non-volatile memory units to stay active for a predetermined time of said non-volatile memory access timer.

* * * * *